US011181366B2

(12) United States Patent
Sanders

(10) Patent No.: US 11,181,366 B2
(45) Date of Patent: Nov. 23, 2021

(54) EXPANDABLE LEVEL WITH FULL FUNCTIONALITY IN BOTH OPEN AND CLOSED POSITIONS

(71) Applicant: Roderick Sanders, Sparks, NV (US)

(72) Inventor: Roderick Sanders, Sparks, NV (US)

( * ) Notice: Subject to any disclaimer, the term of this patent is extended or adjusted under 35 U.S.C. 154(b) by 208 days.

(21) Appl. No.: 16/664,736

(22) Filed: Oct. 25, 2019

(65) Prior Publication Data
US 2020/0132455 A1    Apr. 30, 2020

Related U.S. Application Data

(60) Provisional application No. 62/750,689, filed on Oct. 25, 2018.

(51) Int. Cl.
*G01C 9/28* (2006.01)
*G01C 9/34* (2006.01)
*G01C 9/02* (2006.01)

(52) U.S. Cl.
CPC .............. *G01C 9/34* (2013.01); *G01C 9/02* (2013.01); *G01C 9/28* (2013.01)

(58) Field of Classification Search
CPC .................................. G01C 9/26; G01C 9/28
USPC .......................................... 33/374, 379, 381
See application file for complete search history.

(56) References Cited

U.S. PATENT DOCUMENTS

| 1,206,750 A | 11/1871 | Shelley |
| 1,094,651 A | 4/1914 | Hayden |
| 1,655,766 A | 1/1928 | Hildebrant |
| 2,879,606 A | 3/1959 | Olivere |
| 2,892,260 A | 6/1959 | Mozur |
| 3,104,477 A * | 9/1963 | Edwill .................. G01C 9/28 33/374 |

(Continued)

FOREIGN PATENT DOCUMENTS

| WO | 9603618 | 2/1996 |
| WO | 2009021278 | 2/2009 |

OTHER PUBLICATIONS

Website Link, Downloaded Aug. 25, 2019 Extendable level 700916 global patent Unique to Levimate, our extendable levels with in-built top measuring feature and positive top locking system will ensure deviation precision.

(Continued)

*Primary Examiner* — George B Bennett
(74) *Attorney, Agent, or Firm* — Russ Weinzimmer & Associates, P.C.

(57) ABSTRACT

An expandable level capable of expanding from a fully closed position to a fully open position, with full functionality in both positions. The expandable level includes a central body having at least one horizontal bubble, and two slide portions each having two bubbles, where one bubble on each slide portion is also a horizontal bubble. Even when the expandable level is fully closed, the vertical bubble, the diagonal bubble, and both horizontal bubbles on the slide portions are visible. When the expandable level is fully opened, at least one additional horizontal bubble of the central body becomes visible, thereby showing at least five bubbles. The expandable level can be made in a size that makes it easy to carry and store when closed, nevertheless providing a fully-functional and convenient level tool when open. Thus, the expandable level eliminates the need to carry more than one non-expandable level of different sizes.

14 Claims, 5 Drawing Sheets

(56) References Cited

U.S. PATENT DOCUMENTS

| | | | |
|---|---|---|---|
| 3,161,964 A * | 12/1964 | Myles | B66B 19/002 |
| | | | 33/353 |
| 4,003,134 A | 1/1977 | Adams | |
| 4,130,943 A | 12/1978 | Talbot | |
| 4,152,838 A * | 5/1979 | Cook | G01C 9/28 |
| | | | 33/342 |
| 4,607,437 A | 8/1986 | McSorley, Sr. et al. | |
| 4,862,595 A | 9/1989 | Drumright | |
| 4,894,925 A | 1/1990 | Langmaid | |
| 4,928,395 A | 5/1990 | Good | |
| 5,155,917 A | 10/1992 | Townsend et al. | |
| 5,249,365 A * | 10/1993 | Santiago | G01C 9/28 |
| | | | 33/374 |
| 5,412,875 A | 5/1995 | Hilderbrant | |
| 5,433,011 A | 7/1995 | Scarborough et al. | |
| 5,577,327 A | 11/1996 | Archambault | |
| 5,617,641 A | 4/1997 | Aarhus | |
| 6,041,510 A | 3/2000 | Huff | |
| 6,279,240 B1 | 8/2001 | Bonaventura, Jr. | |
| 6,293,023 B1 | 9/2001 | Schooley | |
| 6,637,120 B2 | 10/2003 | Pustay | |
| 6,640,455 B1 | 11/2003 | Smothers | |
| 6,658,752 B1 * | 12/2003 | Bonaventura, Jr. | G01C 9/26 |
| | | | 33/374 |
| 6,694,632 B1 * | 2/2004 | Schooley | G01C 9/28 |
| | | | 33/374 |
| 7,290,346 B2 * | 11/2007 | Szumer | G01C 9/28 |
| | | | 33/374 |
| 7,478,500 B1 | 1/2009 | Pollock et al. | |
| 7,497,022 B1 * | 3/2009 | Aarhus | G01C 9/26 |
| | | | 33/374 |
| 9,546,867 B2 | 1/2017 | Lueck et al. | |
| 10,955,240 B2 * | 3/2021 | Dorscheid | G01C 9/28 |
| 2002/0116833 A1 * | 8/2002 | Hollenbeck | G01C 9/26 |
| | | | 33/374 |
| 2004/0172846 A1 | 9/2004 | McRae | |
| 2008/0034599 A1 | 2/2008 | Hamilton | |
| 2010/0000107 A1 | 1/2010 | Cobb et al. | |

OTHER PUBLICATIONS

Website Link, Downloaded Aug. 25, 2019 SOLA LSGOM GO! Magnetic Portable Level with Clip and 1 60% Magnified Vial, 3-Inch, Red The SOLA go! Magnetic level with belt clip is always right at hand. It is compact and light weight. The break-resistant acrylic block focus vial with 60% magnification offer a luminous backing for low light conditions.

Website Link, Downloaded Aug. 25, 2019 16" Castool Digital Display Spirit Level With Two Vials Large LCD Display, 0-230Degree Protractor—Easily readable LCD Display shows the exact angle at once.—Measuring range: 0~225°.

Website: https://www.grainger.com/product/STABILA-Aluminum-Pocket-Level-21CK23 Downloaded Aug. 25, 2019 Aluminum Pocket Level, 2-½" Length, Magnetic, Top Read.

Website Link, Downloaded Aug. 26, 2019 CST/berger 17-630 5X Magnifying Hand Level 8-Inch long, Round Telescope Tube Extends to 9-Inch 8" long, round telescope tube extends to 9". The objective lens is mounted on a movable slide which brings distant objects into sharp focus. Eyepiece focusing slide allows regulation of crossline image. 5x magnification of objective and 2x magnification of level bubble.

Website: https://www.amazon.com/dp/B013J6DAH6/ref=psdc_553256_t3_B000AYHEUU Downloaded Aug. 25, 2019 AdirPro 1X Hand Level The AdirPro 1X Hand Level is an economically priced hand level. The 5.25" (127 mm) extends to 5.75". It has an external vial that, is easily replaced in the field.

Website Link, Downloaded Aug. 26, 2019 Irwin Tools Extendable Level, 4-Foot to 10-Foot, 8-inch.

Website: https://cripedistnbuting.com/products/rapid-level-00006-24-to-36-extendable-level Downloaded Aug. 26, 2019 Rapid Level 00006 24" to 36" Extendable Level.

YouTube Link: https://www.youtube.com/watch?v=wMRQc4svHao, Downloaded Aug. 28, 2019 Milwaukee Expandable RedStick Levels—NPS18 Presentation RedStick Expandable Levels are aimed to address many commonly known issues for the Stabila and other expandable levels of this type. Featuring solid locks, extension that won't fail out or become loose. These new levels are ideal for construction, drywalling and many other trades where accuracy over long lengths is key.

YouTube Link: https://www.youtube.com/watch?v=v8w0hfJQh2k, Downloaded Aug. 28, 2019 The Stretch Level System—patent pending.

Davison, patent search, 2012.

\* cited by examiner

EXPANDABLE LEVEL WITH FULL FUNCTIONALITY IN BOTH OPEN AND CLOSED POSITIONS

CROSS-REFERENCE TO RELATED APPLICATIONS

This application claims priority from Provisional Patent Application Ser. No. 62/750,689, filed Oct. 25, 2018, the entire contents of which is incorporated herein by reference.

FIELD OF THE INVENTION

This invention relates generally to levels, and particularly to expandable levels.

BACKGROUND OF THE INVENTION

In the construction industry, it is common for a construction worker, such as a carpenter, a mason, or a metalworker, to use an instrument to assist in creating a horizontal surface (level), a vertical surface (plumb), or a 45 degree sloped surface. A common instrument used for this purpose is called a "level". A level (also called a "bubble level" or a "spirit level") usually includes a long straight frame made from a lightweight material, such aluminum or plastic, having frame dimensions such that the level is easily held in the worker's hands.

The level typically includes one or more clear cylinders filled with a fluid, the fluid also having an air bubble that moves between two symmetrically placed lines along the cylinder so as to indicate the orientation of a surface when the level is placed against the surface to be oriented at a particular angle. Each of these indicating cylinders is commonly called a "bubble". For a level having more than one bubble, the bubbles can be mounted at different orientations with respect to the frame of the level, such as a horizontal bubble mounted parallel to the long sides of the level frame for indicating the angle of horizontal surfaces, a vertical bubble mounted perpendicular to the long sides of the frame for indicating the angle of vertical surfaces, and a diagonal bubble mounted at a 45 degree angle for indicating the angle of surfaces oriented at 45 degrees.

Levels are available in many different sizes, from compact levels of only a few inches in length, to larger levels several feet in length.

In addition, expandable levels that are adjustable in length are known. An expandable level can be collapsed to a shorter length for easier transport and storage. There are many examples of expandable levels presently known and available.

An example of an expandable level is taught in Smothers, U.S. Pat. No. 6,640,455 B1, wherein an extendable carpenter's level is taught that includes a pair of extending body members that can either be extended or contracted by sliding the extendable body members along a standard level frame. However, the apparatus of U.S. Pat. No. 6,640,455 B1 has several disadvantages. For example, when the extendable body members are pushed into a fully closed position along the frame, the two body members obstruct the view of a center bubble of the standard level frame, thereby making it impossible to use the level in the closed position for indicating the angle of surfaces corresponding to the orientation of the center bubble. In fact, obstructing the visibility of the center bubble when the expandable level is in the closed portion substantially reduces the versatility and usefulness of the level, since it can only work to determine the orientation of only two of the three possible orientations. Specifically, the level taught in Smothers cannot be used to indicate when surfaces are vertical while the level is in the closed position.

SUMMARY OF THE INVENTION

The expandable level of the invention is capable of expanding from a fully closed position to a fully open position, while maintaining full level functionality in both the open and closed positions. All three orientations of bubbles (horizontal, vertical, and 45° diagonal) that are included in standard non-expandable levels are available in both the open and closed positions of the expandable level. Further, opening the expandable level exposes one or two additional bubbles, thereby adding even further versatility and capacity when the level is in an expanded position.

The expandable level includes a first slide portion and a second slide portion. Each slide portion includes at least two bubbles: at least one bubble mounted within a hole through each slide portion, and an additional horizontal bubble mounted along the top surface of each slide portion.

An advantage of the expandable level of the invention is that, when in the fully closed position, four bubbles are always visible, the four bubbles including at least a horizontal bubble, a vertical bubble, and a 45 degree diagonal bubble. More specifically, even when the expandable level is fully closed, a horizontal bubble is visible along the top surface of both slide portions, a vertical bubble is visible in a hole through the side of the first slide portion, and a diagonal bubble is visible in a hole through the side of the second slide portion.

Another advantage of the expandable level of the invention is that it can be sized such that when closed, it can fit into the tool slot of a standard carpenter's tool belt, or into a standard pocket of a carpenter's garment. Thus, the expandable level is preferably made to be of a size that is easy to carry and store in a closed position, thereby providing a portable and convenient level measuring tool for the user in both the fully open position, fully closed position, and in all positions therebetween.

A general aspect of the invention is an expandable level capable of expanding from a fully closed position to a fully open position. The expandable level includes: a central body having a first end, a second end, and a central location between the first end and the second end, the central body also having at least a first horizontal bubble supported within a hole extending through the central body at the central location; a first slide portion in sliding relationship with the first end of the central body, the first slide portion having a first vertical bubble supported within a hole extending through the first slide portion, and having a second horizontal bubble mounted along a top surface of the first slide portion; and a second slide portion in sliding relationship with the second end of the central body, the second slide portion having a diagonal bubble supported within a hole extending through the second slide portion, and having a third horizontal bubble mounted along a top surface of the second slide portion.

In some embodiments, the central body is 9 inches long.

In some embodiments, the first slide portion and the second slide portion are each 4.5 inches long.

In some embodiments, the expandable level in the fully closed position is 9 inches long.

In some embodiments, the expandable level in the fully open position is 18 inches long.

In some embodiments, the central body also has a second vertical bubble supported within the hole extending through the central body at the central location.

In some embodiments, the first slide portion is configured to slide continuously between the fully closed position and the fully open position, and the second slide portion is configured to slide continuously between the fully closed position and the fully open position.

In some embodiments, the first slide portion is configured to slide continuously between the fully closed position and the fully open position, the second slide portion is configured to slide continuously between the fully closed position and the fully open position, and when the first slide portion and the second slide portion are in the fully closed position, at least the first horizontal bubble supported within the hole extending through the central body is completely hidden from view by the first slide portion and the second slide portion.

In some embodiments, the second horizontal bubble is inserted into a first top housing that is attached to a first top plate, the first top plate being attached to the first slide portion.

In some embodiments, the third horizontal bubble is inserted into a second top housing that is attached to a second top plate, the second top plate being attached to the second slide portion.

In some embodiments, both the first slide portion and the second slide portion include a rubber end piece.

In some embodiments, the rubber end piece has a rectangular outer surface.

In some embodiments, the rubber end piece has a height of 2.95 inches.

In some embodiments, the rubber end piece has a depth of 1.16 inches.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
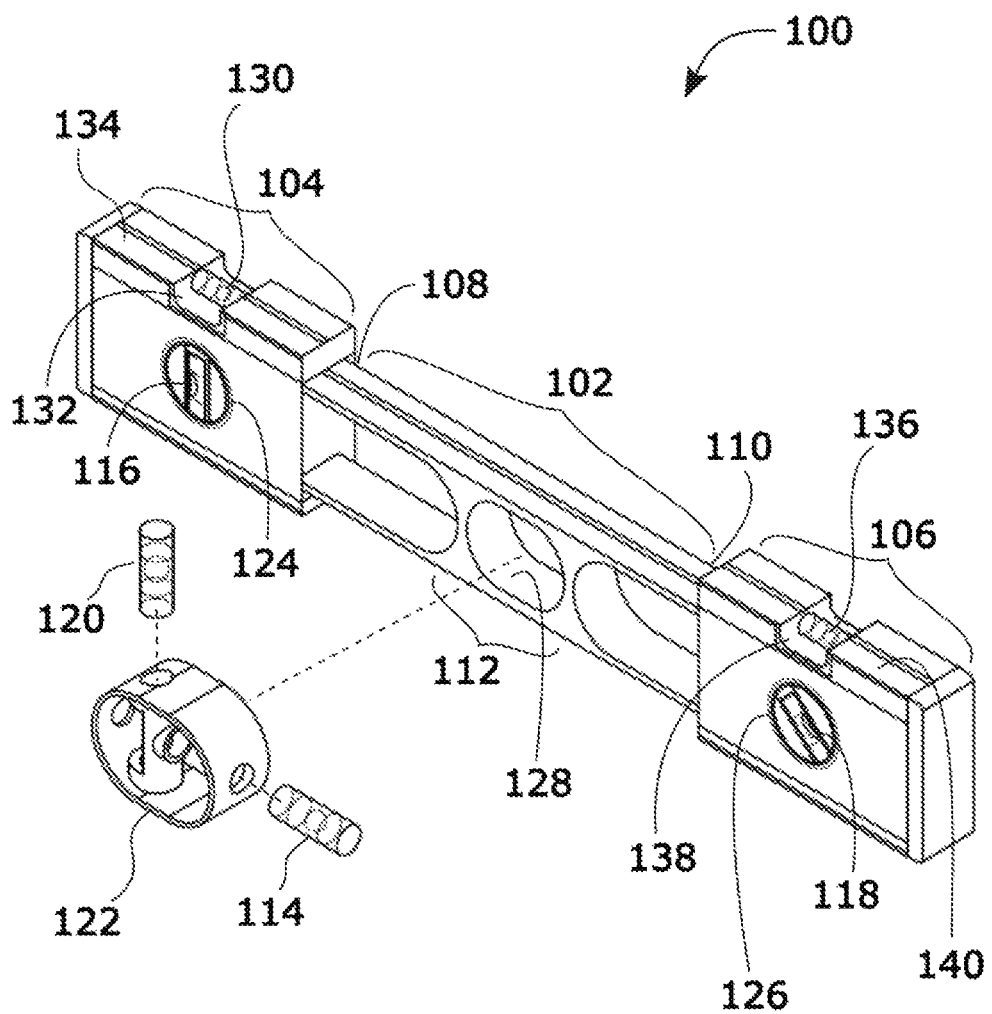
FIG. 1 is an exploded isometric view of the expandable level in the fully open position showing the central body of the expandable level with a central hole that receives a middle bubble housing having two bubbles, the expandable level also having a first slide portion having two bubbles, and a second slide portion having two bubbles.

With reference to FIG. 1, an exploded isometric view of the expandable level 100 in a fully open position is shown. The expandable level 100 includes a central body 102, a first slide portion 104 in sliding relationship with the central body 102, and a second slide portion 106 also in sliding relationship with the central body 102. The central body 102 has a first end 108 and a second end 110, and includes a central location 112 having a central hole 128, with a middle bubble housing 122 therein. The middle bubble housing 122 has at least a first horizontal bubble 114.

The first slide portion 104 includes a first vertical bubble 116 supported within a first slide portion hole 124 that extends though the first slide portion 104. In addition, the first slide portion 104 includes a top second horizontal bubble 130. In this embodiment, the top second horizontal bubble 130 is inserted into a first top housing 132 that is attached to a first top plate 134.

In this embodiment, the middle bubble housing 122 supports two bubbles, for example, the first horizontal bubble 114 and a second vertical bubble 120.

The second slide portion 106 includes a diagonal bubble 118 supported within a second slide portion hole 126 that extends though the second slide portion 106. In addition, the second slide portion 106 includes a top third horizontal bubble 136. In this embodiment, the top third horizontal bubble 136 is inserted into a second top housing 138 that is attached to a second top plate 140. The diagonal bubble 118 is in a downward-sloping 45 degree orientation.

In this embodiment, the first slide portion 104 is configured to slide continuously between the fully closed position and the fully open position, and the second slide portion 106 is configured to slide continuously between the fully closed position and the fully open position.

Figure 2A:
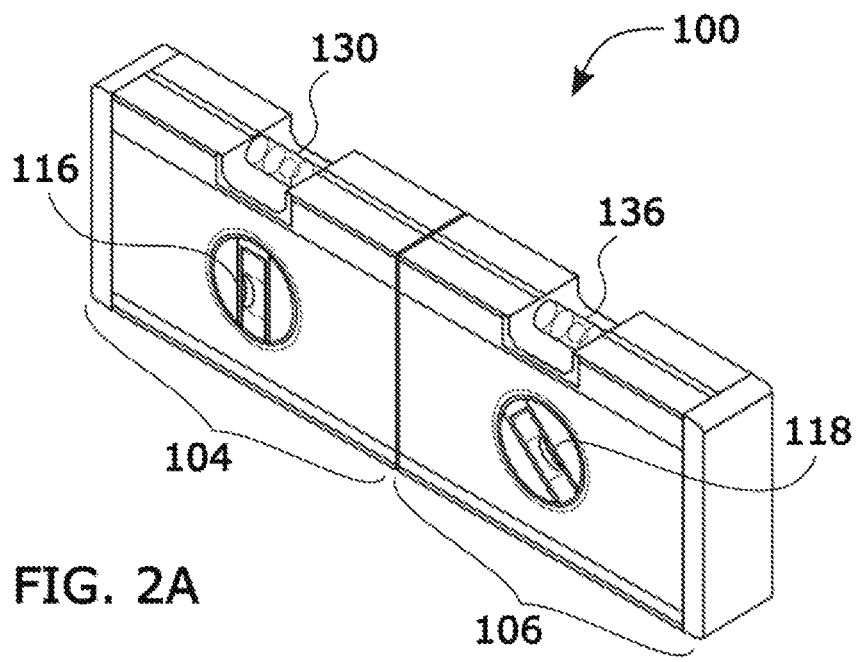
FIG. 2A is an isometric view of the expandable level of FIG. 1 in the fully closed position, showing the first slide portion having a horizontal bubble and a vertical bubble, and the second slide portion having a horizontal bubble and a diagonal bubble in a downward-sloping 45 degree orientation.

When the first slide portion 104 and the second slide portion 106 are in the fully closed position (as shown in FIG. 2A), the first horizontal bubble 114 and the second vertical bubble 120 within the central hole 128 are completely hidden from view.

In preferred embodiments, the central body 102 is 9 inches long, the first slide portion 104 is 4.5 inches long, and the second slide portion 106 is 4.5 inches long. Thus, the expandable level 100 in the fully closed position is 9 inches long, and the expandable level 100 in the fully open position is 18 inches long.

With reference to FIG. 2A, the expandable level 100 is shown in a fully closed position, including the first slide portion 104 and the second slide portion 106. The first slide portion 104 includes the first vertical bubble 116 and the top second horizontal bubble 130. The second slide portion 106 includes the downward-sloping 45 degree orientation bubble 118 and the top third horizontal bubble 136.

Figure 2B:
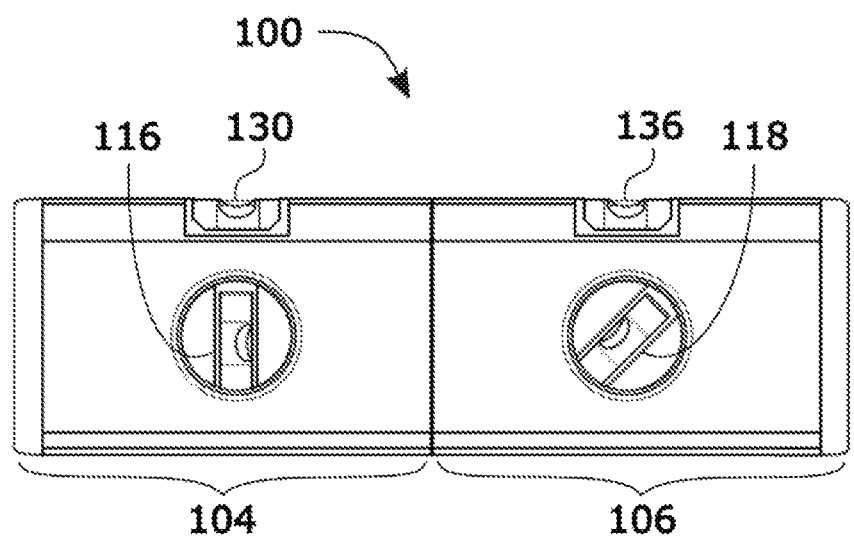
FIG. 2B is a front view of the expandable level of FIG. 2A, but with the diagonal bubble in an upward-sloping 45 degree orientation.

With reference to FIG. 2B, an alternate embodiment of the expandable level 100 includes a diagonal bubble 118 in a upward-sloping 45 degree orientation.

Figure 3A:
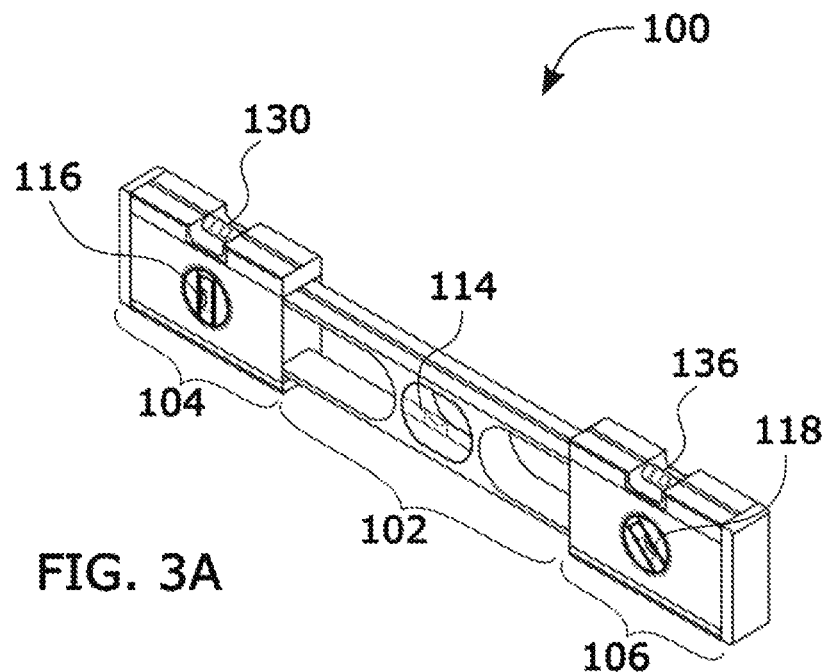
FIG. 3A is an isometric view of the expandable level of FIG. 1, showing the central body having a middle bubble housing having only a single horizontal bubble.

With reference to FIG. 3A, the expandable level 100 is shown in an open position, including the first slide portion 104 and the second slide portion 106. The first slide portion 104 includes the first vertical bubble 116 and the top second horizontal bubble 130. The second slide portion 106 includes the top third horizontal bubble 136, and the diagonal bubble 118 in a downward-sloping 45 degree orientation. In this embodiment, the central body 102 includes only one bubble, e.g., the first horizontal bubble 114.

Figure 3B:
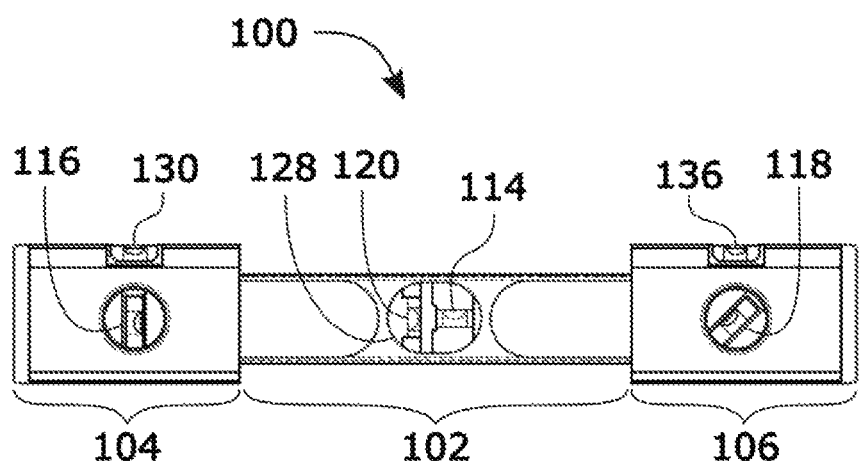
FIG. 3B is a front view of the expandable level of FIG. 1, showing the central body having a middle bubble housing having both a horizontal bubble and a vertical bubble, the second slide portion having a diagonal bubble in an upward-sloping 45 degree orientation.

With reference to FIG. 3B, an embodiment of the expandable level 100 is shown wherein the central body 102 includes two bubbles mounted in the central hole 128, e.g., the first horizontal bubble 114 and the second vertical bubble 120. Also, the diagonal bubble 118 is in an upward-sloping 45 degree orientation.

Figure 4:
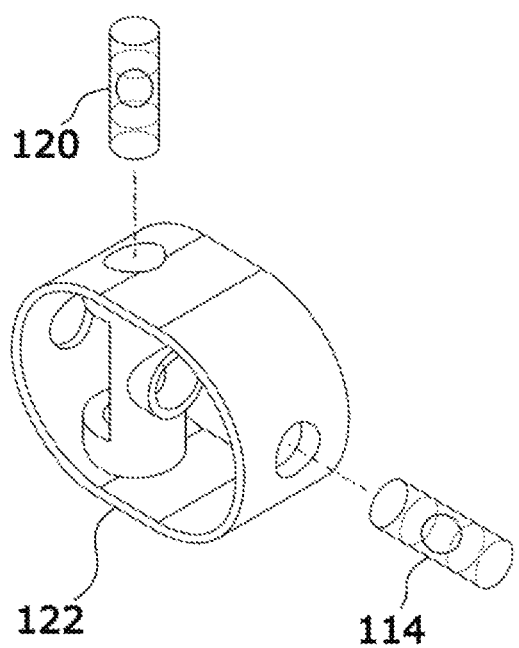
FIG. 4 is an exploded view of the middle bubble housing, with a horizontal bubble and a vertical bubble to be mounted therein.

With reference to FIG. 4, an exploded view of the middle bubble housing 122 is shown, with the first horizontal bubble 114, and the second vertical bubble 120. The first horizontal bubble 114 and the second vertical bubble 120 can be included in embodiments that include two bubbles in the central hole 128 of the central location 112 of the expandable level 100 (as shown in FIG. 1 and FIG. 3B).

Figure 5:
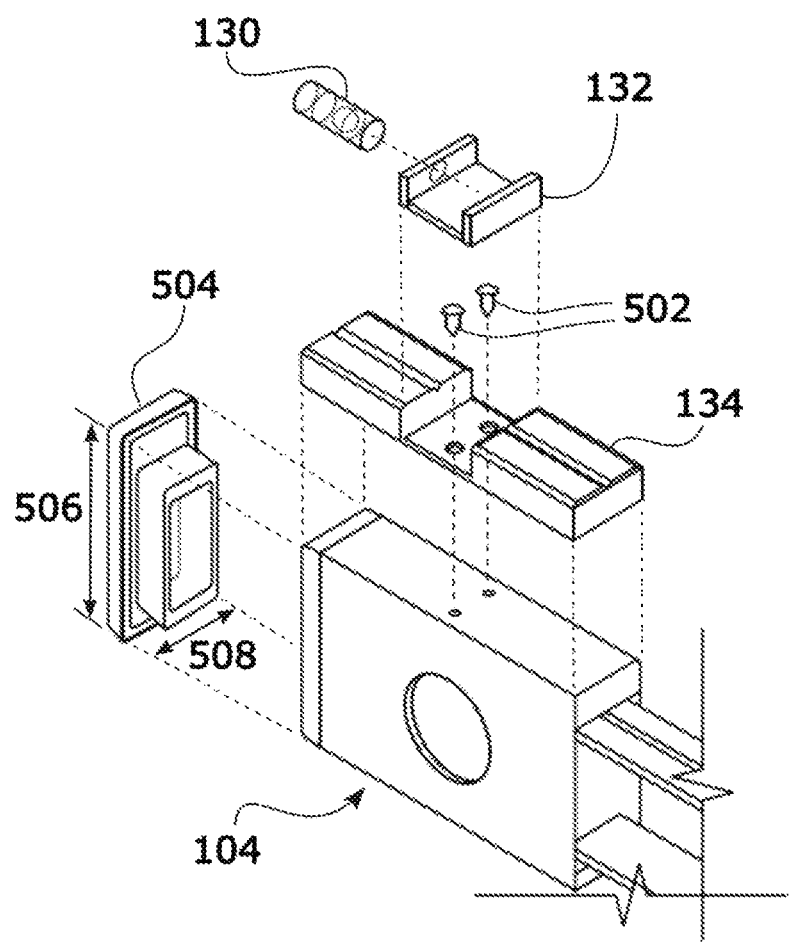
FIG. 5 is an exploded view of a horizontal bubble to be mounted in a top housing, the top housing to be secured on a top plate, the top plate to be screwed onto a top surface of a slide portion, and an end piece to be inserted into an end of the slide portion.

With reference to FIG. 5, an exploded view is shown of the top second horizontal bubble 130, the first top housing 132, the first top plate 134, the first slide portion 104, and a rubber end piece 504. In this embodiment, the first top plate 134 is attached to the first slide portion 104 by two first top plate attachment screws 502.

In this embodiment, the top second horizontal bubble 130 is to be inserted into the first top housing 132, the first top housing 132 is to be attached to the first top plate 134, the first top plate 134 is to be attached to the top surface of the first slide portion 104.

Similarly, regarding the second slide portion 106 (see FIG. 1) the top third horizontal bubble 136 is to be inserted into the second top housing 138, the second top housing 138 is to be attached to the second top plate 140, and the second top plate 140 is to be attached to the top surface of the second slide portion 106.

In this embodiment, both the first slide portion 104 and the second slide portion 106 (shown in FIG. 1) include a rectangular rubber end piece 504. In this exemplary embodiment, the rubber end piece 504 has a height 506 of 2.95 inches and a depth 508 of 1.16 inches.

Other modifications and implementations will occur to those skilled in the art without departing from the spirit and the scope of the invention as claimed. Accordingly, the above description is not intended to limit the invention, except as indicated in the following claims.

What is claimed is:

1. An expandable level capable of expanding from a fully closed position to a fully open position, the expandable level comprising:
a central body having a first end, a second end, and a central location between the first end and the second end, the central body also having at least a first horizontal bubble supported within a hole extending through the central body at the central location;
a first slide portion in sliding relationship with the first end of the central body, the first slide portion having a first vertical bubble supported within a hole extending through the first slide portion, and having a second horizontal bubble mounted along a top surface of the first slide portion; and
a second slide portion in sliding relationship with the second end of the central body, the second slide portion having a diagonal bubble supported within a hole extending through the second slide portion, and having a third horizontal bubble mounted along a top surface of the second slide portion.

2. The expandable level of claim 1, wherein the central body is 9 inches long.

3. The expandable level of claim 1, wherein the first slide portion and the second slide portion are each 4.5 inches long.

4. The expandable level of claim 1, wherein the expandable level in the fully closed position is 9 inches long.

5. The expandable level of claim 1, wherein the expandable level in the fully open position is 18 inches long.

6. The expandable level of claim 1, wherein the central body also has a second vertical bubble supported within the hole extending through the central body at the central location.

7. The expandable level of claim 1, wherein
the first slide portion is configured to slide continuously between the fully closed position and the fully open position, and
the second slide portion is configured to slide continuously between the fully closed position and the fully open position.

8. The expandable level of claim 1, wherein
the first slide portion is configured to slide continuously between the fully closed position and the fully open position,
the second slide portion is configured to slide continuously between the fully closed position and the fully open position, and
when the first slide portion and the second slide portion are in the fully closed position, at least the first horizontal bubble supported within the hole extending through the central body is completely hidden from view by the first slide portion and the second slide portion.

9. The expandable level of claim 1, wherein the second horizontal bubble is inserted into a first top housing that is attached to a first top plate, the first top plate being attached to the first slide portion.

10. The expandable level of claim 1, wherein the third horizontal bubble is inserted into a second top housing that is attached to a second top plate, the second top plate being attached to the second slide portion.

11. The expandable level of claim 1, wherein both the first slide portion and the second slide portion include a rubber end piece.

12. The expandable level of claim 11, wherein the rubber end piece has a rectangular outer surface.

13. The expandable level of claim 11, wherein the rubber end piece has a height of 2.95 inches.

14. The expandable level of claim 11, wherein the rubber end piece has a depth of 1.16 inches.

* * * * *